US008729170B2

(12) United States Patent
Thiria et al.

(10) Patent No.: US 8,729,170 B2
(45) Date of Patent: May 20, 2014

(54) COATING COMPOSITIONS AND TEXTILE FABRICS COATED THEREWITH

(75) Inventors: Remi Thiria, Fort Mill, SC (US); Pascale Jackson, Rock Hill, SC (US)

(73) Assignees: Bluestar Silicones France SAS, Lyon Cedex (FR); Bluestar Silicon USA Corp, East Brunswick, NJ (US)

( * ) Notice: Subject to any disclaimer, the term of this patent is extended or adjusted under 35 U.S.C. 154(b) by 900 days.

(21) Appl. No.: 12/647,954

(22) Filed: Dec. 28, 2009

(65) Prior Publication Data
US 2010/0297903 A1 Nov. 25, 2010

Related U.S. Application Data

(60) Provisional application No. 61/141,416, filed on Dec. 20, 2008.

(51) Int. Cl.
B05D 3/02 (2006.01)
B32B 27/12 (2006.01)
C08G 77/04 (2006.01)
C08G 77/12 (2006.01)
C08G 77/20 (2006.01)

(52) U.S. Cl.
USPC ............. 524/425; 528/10; 528/15; 528/31; 442/49; 442/65; 427/387

(58) Field of Classification Search
CPC .......... B32B 9/047; B32B 27/12; B05D 3/02; B05D 3/0254; C08K 3/26; C08G 77/04; C08G 77/12; C08G 77/20
See application file for complete search history.

(56) References Cited

U.S. PATENT DOCUMENTS

| | | | |
|---|---|---|---|
| 3,142,655 A | 7/1964 | Bobear | |
| 3,159,601 A | 12/1964 | Ashby | |
| 3,159,602 A | 12/1964 | Hamilton et al. | |
| 3,220,972 A | 11/1965 | Lamoreaux | |
| 3,377,432 A | 4/1968 | Abbott et al. | |
| 3,419,593 A | 12/1968 | Willing | |
| 3,715,334 A | 2/1973 | Karstedt | |
| 3,814,730 A | 6/1974 | Karstedt | |
| 3,821,140 A | 6/1974 | Milbert | |
| 3,836,489 A | 9/1974 | Bargain | |
| 3,839,266 A | 10/1974 | Bargain | |
| 4,184,006 A | 1/1980 | Hockemeyer et al. | |
| 4,427,801 A * | 1/1984 | Sweet | 523/212 |
| 4,450,283 A | 5/1984 | McAfee et al. | |
| 4,472,470 A * | 9/1984 | Modic | 428/145 |
| 4,500,584 A * | 2/1985 | Modic | 428/145 |
| 4,741,966 A | 5/1988 | Cavezzan | |
| 5,082,894 A * | 1/1992 | VanWert et al. | 524/730 |
| 5,193,847 A | 3/1993 | Nakayama | |
| 5,296,298 A | 3/1994 | Fujimoto et al. | |
| 5,446,087 A * | 8/1995 | Chizat et al. | 524/588 |
| 5,506,289 A * | 4/1996 | McDermott et al. | 524/306 |
| 5,516,938 A | 5/1996 | Schlaeppi et al. | |
| 5,576,110 A * | 11/1996 | Lin et al. | 428/447 |
| 5,629,387 A * | 5/1997 | Frances et al. | 525/478 |
| 5,739,948 A * | 4/1998 | Kushibiki et al. | 359/321 |
| 5,741,834 A * | 4/1998 | Ward et al. | 523/213 |
| 5,789,084 A * | 8/1998 | Nakamura et al. | 428/447 |
| 5,877,256 A * | 3/1999 | Nakamura et al. | 524/765 |
| 6,268,300 B1 * | 7/2001 | Hernandez et al. | 442/168 |
| 6,369,184 B1 * | 4/2002 | Bohin et al. | 528/15 |
| 6,420,037 B1 * | 7/2002 | Tsuji et al. | 428/447 |
| 6,425,600 B1 * | 7/2002 | Fujiki et al. | 280/728.1 |
| 6,562,737 B1 * | 5/2003 | Bohin et al. | 442/59 |
| 7,059,627 B2 * | 6/2006 | Ikeno et al. | 280/728.1 |
| 7,150,803 B2 * | 12/2006 | Aketa et al. | 156/329 |
| 7,153,583 B2 * | 12/2006 | Azechi et al. | 428/447 |
| 7,537,238 B2 * | 5/2009 | Kanuma | 280/728.1 |
| 7,674,348 B2 * | 3/2010 | Aketa et al. | 156/325 |
| 8,058,190 B2 * | 11/2011 | Sweet et al. | 442/149 |
| 8,287,685 B2 * | 10/2012 | Be et al. | 156/314 |
| 2004/0059034 A1 * | 3/2004 | Desne et al. | 524/413 |
| 2004/0222618 A1 | 11/2004 | Azechi et al. | |
| 2005/0020738 A1 * | 1/2005 | Jackson et al. | 524/99 |
| 2005/0053793 A1 * | 3/2005 | Benay-Oun et al. | 428/447 |
| 2005/0075020 A1 * | 4/2005 | Benayoun et al. | 442/87 |
| 2005/0137321 A1 | 6/2005 | Dumont et al. | |
| 2005/0205829 A1 * | 9/2005 | Magd et al. | 252/8.61 |
| 2006/0121221 A1 * | 6/2006 | Aketa et al. | 428/35.4 |
| 2006/0286390 A1 * | 12/2006 | Yaginuma et al. | 428/447 |
| 2008/0003370 A1 * | 1/2008 | Sweet et al. | 427/394 |
| 2008/0021190 A1 * | 1/2008 | Yaginuma et al. | 528/31 |
| 2009/0026745 A1 * | 1/2009 | Dumont et al. | 280/743.1 |
| 2009/0264035 A1 * | 10/2009 | Pouchelon et al. | 442/59 |
| 2011/0077344 A1 * | 3/2011 | Hasegawa et al. | 524/500 |
| 2011/0098400 A1 * | 4/2011 | Blanc-Magnard et al. | 524/500 |

FOREIGN PATENT DOCUMENTS

| | | |
|---|---|---|
| EP | 0 553 840 A1 | 8/1993 |
| EP | 1 342 755 A2 | 9/2003 |
| WO | 2008/107407 A1 | 9/2008 |

OTHER PUBLICATIONS

Notice of Opposition dated Sep. 24, 2013, Opposed EP Patent No. 2382271 (21 pages).

* cited by examiner

Primary Examiner — Robert S Loewe
(74) Attorney, Agent, or Firm — Miles and Stockbridge

(57) ABSTRACT

A curable coating composition that exhibits improved cure and adhesion to various substrates, especially synthetic textiles used in the manufacture of air bags, and good air pressure holding performance.

17 Claims, No Drawings

COATING COMPOSITIONS AND TEXTILE FABRICS COATED THEREWITH

CROSS REFERENCE TO RELATED APPLICATIONS

This application claims priority to U.S. Provisional Application 61/141,416, filed Dec. 30, 2008, the content of which is incorporated herein by reference in its entirety.

FIELD OF THE INVENTION

The present invention relates to a new curable silicone composition having excellent self-adhesive properties when coated and cured on a textile fabrics.

This coating provides excellent adhesive properties to the coated fabric performance in regards to crease flex abrasion tests and provides a good air pressure holding performance.

Airbag fabrics using such new curable silicone composition are also encompassed within this invention.

BACKGROUND OF THE PRIOR ART

At the present time, many motor vehicles are equipped with an acceleration sensor that measures the decelerations of the vehicle. When the reference deceleration value is exceeded, an explosive pellet triggers the combustion of an additional charge, and then that of the combustible solid. This solid is converted into gas (for example nitrogen) and inflates the cushion. An airbag (or inflatable cushion) is an air-filled bag made of pleated and tight-stitched polyamide fabric. For further details regarding these personal protection bags or "airbags", reference may be made especially to reference U.S. Pat. No. 5,193,847.

Historically, these bags are formed by a web of synthetic fibre, for example polyamide, coated on at least one of its faces with a layer of an elastomer such as polychloroprene. But the desire to decrease the folded size of the completed airbag and the tendency of polychloroprene to degrade, with exposure to heat, and to release hazardous chemicals (the components of hydrochloric acid) has led that silicone compositions have easily supplanted polychloroprenes in this application.

Silicone compositions have thus found an important application in the coating of flexible—woven, knitted or non-woven—materials used for manufacturing personal protection bags for the occupants of vehicles, also known as "airbags".

In an effort to improve the performance of the silicone coating, prior art US-2005137321 describes a method for improving the tearing and combing resistance of coated fabrics for airbags by using a silicon composition comprising an additive consisting of a polyorganosiloxane resin and calcium carbonate. After coating fabric supports with said composition and crosslinking, the thus coated supports exhibit adherence and resistance properties and high tearing and combing resistance properties.

While fabrics coated with conventional silicone compositions may be satisfactory for standard airbag applications, the airbag industry is now required to satisfy requirements where pressurised fluids are to be retained in a fabric envelope for a relatively long period. This requirement exists for example in the application of such coatings to side curtain airbags for the automotive industry. Curtain airbags are now designed to inflate as quickly as driver- and passenger-side bags, but they must deflate very slowly to protect the occupants during roll over and side impact. The side curtains unfold to form a cushioned curtain between passengers and some of the side of the car body, e.g., the windows. As the intention is not merely to cushion the blow on impact itself, as is the case for conventional driver and passenger airbags, but e.g. to protect passengers when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain fluid pressure for a relatively extended period of time, e.g. in emergency chutes for aeroplanes, inflatable rafts etc. Thus, it is now imperative that the bag exhibits a very low leakage rate after the bag experiences peak pressure during the instantaneous quick inflation. Hence, the coating on the bag must be performant enough to withstand the shock and stresses when the bag is inflated so quickly.

Silicone polymers have excellent thermal properties but have relatively high permeability to gases, when compared to many other elastomers. This has not been a matter of concern in coatings used for conventional airbags, since the retention time requirements are very small. The advent of side curtains, with higher air retention requirements is bringing to light the difficulties in achieving the desired retention properties at desired add-on levels.

That aside, silicone rubbers obtained from curing conventional silicone compositions originally have poor adhesive properties and have had problems concerning the property of bonding or adhering to fibers. As an expedient for this, it has been attempted to impart self-adhesive properties to silicone rubbers by adding a suitable additive ingredient to silicone rubber raw compositions.

For example, in prior art U.S. Pat. No. 5,296,298, example of silicone compositions showing good adhesion on the airbag support are described. However, these compositions are not adapted to the new expectations of airbag manufacturers as regards controlling the slipperiness properties of the airbag.

Furthermore, there is still a need for good adhesive properties so that it fulfils the requirement of standard test used within the airbag field such as "The Crease Flex Testing method". This method is employed for repeated bending and it determines the stage of dryness and adherence reached by a material covered with silicone and used for airbags.

The present invention is directed towards overcoming the drawbacks of the prior art.

SUMMARY OF THE INVENTION

In this perspective, one of the important objectives of the invention is to provide a silicone coating composition that may be cured by polyaddition or free-radical reactions, which is useful especially for applications in the field of inflatable safety bags for vehicles, or airbags, and which has, after curing and coating on a fabric, optimum properties in terms of pressure retention characteristics (air-holding), high resistance to sudden inflation, slipperiness, i.e. a good coefficient of friction, abrasion (rubbing-off), high adhesion to the substrate and good thermal resistance. An airbag coated with the present silicone coating composition is also disclosed. This coating provides excellent adhesive properties to the coated fabric and provides a good air pressure holding performance and good performance in regards to crease flex abrasion tests.

Airbag fabrics using such new curable silicone composition are also encompassed within this invention.

DETAILED DESCRIPTION

According to a first aspect of the invention, there is provided a curable silicone composition (A) useful for coating textile fabrics and comprising:

(1) components (a-1) or (a-2):
  (a-1) corresponding to at least one polyorganosiloxane that may be cured by the action of a catalyst based on at least one organic peroxide, and
  (a-2) corresponding to a polyorganosiloxane blend that may be cured by polyaddition reactions, comprising:
    at least one organopolysiloxane (I) having an average of at least two silicon-bonded aliphatically unsaturated hydrocarbon substituents on the molecule, and
    at least one organopolyorganosiloxane (II) and/or at least one organosilicon crosslinker (II') having an average of at least 2 and most preferably at least 3 silicon-bonded hydrogen on the molecule, (2) an effective amount of a curing catalyst (III) consisting: when component (a-1) is used, of at least one organic peroxide, and when component (a-2) is used, of at least one catalyst able to promote the reaction of the aliphatically unsaturated hydrocarbon substituents with SiH groups, (3) at least 10 weight parts, per 100 weight parts of the curable silicone composition, of an organopolysiloxane resin (IV) of formula $MM^{Vi}Q$ and consisting essentially of:
  (a) monovalent siloxane units $M^{Vi}$ of the formula $R'R_2SiO_{1/2}$;
  (b) monovalent siloxane units M of the formula $R_3SiO_{1/2}$, and
  (c) tetravalent siloxane units Q of the formula $SiO_{4/2}$,
  wherein R denotes a monovalent hydrocarbon group and R' denotes a vinyl group:

(4) an organopolysiloxane resin (V) different from the said organopolysiloxane resin (IV) and comprising at least two different siloxane units chosen from those of M siloxane unit of formula $R_3SiO_{1/2}$, D siloxane unit of formula $R_2SiO_{2/2}$, T siloxane unit of formula $RSiO_{3/2}$ and Q siloxane unit of formula $SiO_{4/2}$,
  wherein R denotes a monovalent hydrocarbon group, with the conditions that at least one of these siloxane units being a T or Q siloxane unit and that at least one of the M, D and T siloxane units comprises an alkenyl group (5) at least one adhesion promoter (VI),
(6) at least one reinforcing filler (VII),
(7) optionally at least one polydiorganosiloxane gum (XI) which is a linear or partially-branched homopolymer or copolymer having at least 2 alkenyl groups per molecule and the said gum having a viscosity of greater than 500,000 mPa·s at 25° C.,
(8) optionally, at least one curing inhibitor (VIII),
(9) optionally, at least one coloration additive (IX), and
(10) optionally, at least one additive (X) for improving the fire resistance.

It is to the Applicant's credit to have demonstrated the importance of the presence of specific combination of:
  at least 10 weight parts, per 100 weight parts of the curable silicone composition, of an organopolysiloxane resin (IV) of formula $MM^{Vi}Q$, and
  an organopolysiloxane resin (V) different from organopolysiloxane resin (IV) which also bears in its structure alkenyl groups.

The presence of such specific combination within a curable silicone coating composition provides good air pressure holding performance and good performance in regards to crease flex abrasion tests (adhesive properties) of the coated fabric.

This is all the more surprising since this gain does not become lost at the expense of the other hardness, mechanical strength, surface uniformity and heat resistance properties of the silicone coating.

In a preferred embodiment of the invention, the organopolysiloxane resin (IV) is present from 15 to 50 weight parts per 100 weight parts of the curable silicone composition and most preferably at 20 to 40 weight parts per 100 weight parts of the curable silicone composition.

In a preferred embodiment of the invention the organopolysiloxane resin (V) is added at 1 to 50 weight parts per 100 weight parts of the curable silicone composition.

Preferably, the organopolysiloxane resin (V) is selected from the group consisting of:
  an organopolysiloxane resin of formula $MT^{Vi}Q$ consisting essentially of:
    (a) trivalent siloxane units $T^{Vi}$ of the formula $R'SiO_{3/2}$;
    (b) monovalent siloxane units M of the formula $R_3SiO_{1/2}$, and
    (c) tetravalent siloxane units Q of the formula $SiO_{4/2}$
  an organopolysiloxane resin of formula $MD^{Vi}Q$ consisting essentially of:
    (a) divalent siloxane units $D^{Vi}$ of the formula $RR'SiO_{2/2}$;
    (b) monovalent siloxane units M of the formula $R_3SiO_{1/2}$, and
    (c) tetravalent siloxane units Q of the formula $SiO_{4/2}$
  an organopolysiloxane resin of formula $MDD^{Vi}Q$ consisting essentially of:
    (a) divalent siloxane units $D^{Vi}$ of the formula $RR'SiO_{2/2}$;
    (b) divalent siloxane units D of the formula $R_2SO_{2/2}$
    (b) monovalent siloxane units M of the formula $R_3SiO_{1/2}$, and
    (c) tetravalent siloxane units Q of the formula $SiO_{4/2}$
  an organopolysiloxane resin of formula $M^{Vi}Q$ consisting essentially of:
    (a) monovalent siloxane units $M^{Vi}$ of the formula $R'R_2SiO_{1/2}$; and
    (b) tetravalent siloxane units Q of the formula $SiO_{4/2}$, and
  an organopolysiloxane resin of formula $M^{Vi}T^{Vi}Q$ consisting essentially of:
    (a) monovalent siloxane units $M^{Vi}$ of the formula $R'R_2SO_{1/2}$;
    (b) trivalent siloxane units $T^{Vi}$ of the formula $R'SiO_{3/2}$, and
    (c) tetravalent siloxane units Q of the formula $SiO_{4/2}$
  wherein R denotes a monovalent hydrocarbon group and R' denotes a vinyl group:

The most preferred organopolysiloxane resin (V) is an organopolysiloxane resin of formula $MD^{Vi}Q$ consisting essentially of:
  (a) divalent siloxane units $D^{Vi}$ of the formula $RR'SiO_{2/2}$;
  (b) monovalent siloxane units M of the formula $R_3SiO_{1/2}$, and
  (c) tetravalent siloxane units Q of the formula $SiO_{4/2}$
  wherein R denotes a monovalent hydrocarbon group and R' denotes a vinyl group:

The polyorganosiloxane (a-1) that is curable by the action of a catalyst based on at least one organic peroxide is advantageously a product containing siloxyl units of formula:

$$R^1_a SiO\frac{(4-a)}{2} \quad (I\text{-}1)$$

in which:
the symbols $R^1$, which may be identical or different, represent a hydrocarbon-based group containing from 1 to 12 carbon atoms and preferably from 1 to 8 carbon atoms, which is optionally substituted, and
a is 1, 2 or 3.
Preferably, the symbols $R^1$ are chosen from:
methyl, ethyl, propyl, butyl, hexyl and dodecyl groups,
cycloalkyl groups, for instance cyclohexyl,
alkenyl groups, for instance vinyl, allyl, butenyl and hexenyl groups,
aryl groups, for instance phenyl, tolyl and aralkyl groups such as β-phenylpropyl, and
the groups mentioned above in which one or more hydrogen atoms are replaced with one or more halogen atom, a cyano group or a cyano group equivalent, for instance a chloromethyl, trifluoropropyl or cyanoethyl.

Even more preferentially, the polyorganosiloxanes (a-1) are terminated at the chain ends with trimethylsilyl, dimethylvinyl, dimethylhydroxysilyl or trivinylsilyl units.

In one particularly advantageous embodiment, the polyorganosiloxanes (a-1) contain at least two alkenyl groups per molecule.

Among the organic peroxides that may be used with component (a-1) according to the invention, mention may be made of benzoyl peroxide, bis(p-chlorobenzoyl)peroxide, bis(2,4-dichlorobenzoyl)peroxide, dicumyl peroxide, di-t-butyl peroxide, 2,5-dimethyl-2,5-di(t-butylperoxy)hexane, t-butyl perbenzoate, t-butylcumyl peroxide, halogenated derivatives of the peroxides mentioned above, for instance bis(2,4-dichlorobenzoyl)peroxide, 1,6-bis(p-toluoyl-peroxycarbonyloxy)hexane, 1,6-bis(benzoylperoxycarbonyloxy)hexane, 1,6-bis(p-toluoyl-peroxycarbonyloxy)butane and 1,6-bis(2,4-dimethylbenzoylperoxycarbonyloxy)hexane.

The polyorganosiloxane (I) of the silicone coating composition (A) used for the mode of curing by means of polyaddition reactions comprises:

(i) siloxyl units of formula (I-1):

$$R^1_a Z_b SiO\frac{4-(a+b)}{2} \quad (I\text{-}1)$$

in which:
the symbols $R^1$ represent an alkenyl group, preferably a vinyl or allyl group,
the symbols Z, which may be identical or different, each represent a monovalent hydrocarbon-based group, free of unfavourable action on the activity of the catalyst and chosen from alkyl groups containing from 1 to 8 carbon atoms inclusive, optionally substituted with at least one halogen atom, and also from aryl groups,
a is 1 or 2, b is 0, 1 or 2 and the sum a+b is equal to 1, 2 or 3, and optionally (ii) other siloxyl units of formula (I-2):

$$Z_c SiO\frac{4-c}{2} \quad (I\text{-}2)$$

in which:
Z has the same meaning as above and c is 0, 1, 2 or 3.

This polydiorganosiloxane (I) may have a viscosity at least equal to 100 mPa·s and preferably less than 200,000 mPa·s.

All the viscosities concerned in the present specification correspond to a dynamic viscosity magnitude that is measured, in a manner that is known per se, at 25° C.

The polyorganosiloxane (I) may be formed solely from units of formula (I-1) or may contain, in addition, units of formula (I-2). Similarly, it may have a linear, branched, cyclic or network structure. Z is generally chosen from methyl, ethyl and phenyl radicals, 60 mol % (or in numerical terms) at least of the radicals Z being methyl radicals.

Examples of siloxyl units of formula (I-1) are vinyldimethylsiloxyl, vinylphenylmethylsiloxyl, vinylmethylsiloxyl and vinylsiloxyl units.

Examples of siloxyl units of formula (I-2) are the units $SiO_{4/2}$, dimethylsiloxyl, methylphenylsiloxyl, diphenylsiloxyl, methylsiloxyl and phenylsiloxyl.

Examples of polyorganosiloxanes (I) are linear and cyclic compounds, for instance: di methyl polysiloxanes containing dimethylvinylsilyl end groups, (methylvinyl)(dimethyl)-polysiloxane copolymers containing trimethylsilyl end groups, (methylvinyl)(dimethyl)-polysiloxane copolymers containing dimethylvinylsilyl end groups and cyclic methylvinylpolysiloxanes.

Advantageously, the polyorganosiloxane (II) comprises siloxyl units of formula (II-1):

$$H_d L_e SiO\frac{4-(d+e)}{2} \quad (II\text{-}1)$$

in which:
the groups L, which may be identical or different, each represent a monovalent hydrocarbon-based group, free of unfavourable action on the activity of the catalyst and chosen, preferably, from an alkyl group containing from 1 to 8 carbon atoms inclusive, optionally substituted with at least one halogen atom, advantageously from methyl, ethyl, propyl and 3,3,3-trifluoropropyl groups, and aryl groups, and advantageously a xylyl, tolyl or phenyl radical,
d is 1 or 2, e is 0, 1 or 2, the sum d+e is equal to 1, 2 or 3, and
optionally, at least some of the other units being units of mean formula:

$$L_g SiO\frac{4-g}{2} \quad (II\text{-}2)$$

in which the groups L have the same meaning as above and g is equal to 0, 1, 2 or 3.

The dynamic viscosity of this polyorganosiloxane (II) is at least equal to 10 mPa·s and preferably between 20 and 1000 mPa·s.

The polyorganosiloxane (II) may be formed solely from units of formula (II-1) or may also comprise units of formula (II-2). The polyorganosiloxane (II) may have a linear, branched, cyclic or network structure. The group L has the same meaning as the group Z above. Examples of units of formula (II-1) are: $H(CH_3)_2SiO_{1/2}$, $HCH_3SiO_{2/2}$ and $H(C_6H_5)SiO_{2/2}$.

The examples of units of formula (II-2) are the same as those given above for the units of formula (I-2).

Examples of polyorganosiloxanes (II) are linear and cyclic compounds, for instance:
  dimethylpolysiloxanes containing hydrogenodimethylsilyl end groups,
  copolymers containing (dimethyl)(hydrogenomethyl)polysiloxane units containing trimethylsilyl end groups,
  copolymers containing (dimethyl)(hydrogenomethyl)polysiloxane units containing hydrogenodimethylsilyl end groups,
  hydrogenomethylpolysiloxanes containing trimethylsilyl end groups,
  cyclic hydrogenomethylpolysiloxanes.

The compound (II) may optionally be a mixture of a dimethylpolysiloxane containing hydrogenodimethylsilyl end groups and of a polyorganosiloxane comprising at least three hydrogenosiloxyl group.

The ratio of the number of hydrogen atoms linked to silicon in the polyorganosiloxane (II) and in the crosslinker (II') to the total number of groups containing alkenyl unsaturation of the polyorganosiloxane (I) is between 0.4 and 10, preferably between 0.6 and 5 and most preferably between 1.5 to 2.5.

According to one particular embodiment, the following are used:
  at least one linear polyorganosiloxane (I) comprising chains formed from units of formula (I-2) in which c=2, blocked at each of their ends with units of formula (I-1) in which a=1 and b=2, and
  at least one linear polyorganosiloxane (II) comprising in its structure at least three hydrogen atoms linked to silicon, located in the chains and/or at chain ends.

According to another particular embodiment, the following are used:
  at least one linear polyorganosiloxane (I) comprising chains formed from units of formula (I-2) in which c=2, blocked at each of their ends with units of formula (I-1) in which a=1 and b=2, and
  at least one linear polyorganosiloxane (I) comprising chains formed from units of formula (II-1) in which d=1 and e=1 and optionally units of formula (II-2) in which g=2, blocked at each of their ends with units of formula (II-1) in which d=1 and e=2.

Organosilicon crosslinker (II') for use in the curable silicone coating composition according to the invention are preferably selected from silanes, low molecular weight organosilicon resins and short chain organosiloxane polymers. Organosilicon crosslinker (II') compound has at least 3 silicon-bonded hydrogens which are capable of reacting with the silicon-bonded aliphatically unsaturated hydrocarbon substituent of polyorganosiloxane (I) by addition reaction between the crosslinking organosilicon compound and the organopolysiloxane.

A suitable silane which may serve as organosilicon crosslinker (II') compound is methyltrihydrogenosilane. Suitable organosilicon resin compounds include organosilicon resins consisting mainly of tetrafunctional siloxane units of the formula $SiO_{4/2}$ and monofunctional units $R_yH_wSiO_{1/2}$, wherein R is a monovalent hydrocarbon group having up to 18 carbon atoms, v and w each have a value of from 0 to 3, the sum of v+w being 3. Suitable short chain organosiloxane polymers include those having at least 3 silicon-bonded hydrogen atoms per molecule and may be linear or cyclic. Preferred organosilicon crosslinkers have the general formula:

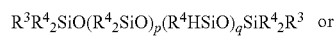

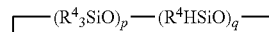

wherein $R^4$ denotes an alkyl or aryl group having up to 10 carbon atoms, $R^3$ is a group $R^4$ or a hydrogen atom, p has a value of from 0 to 20, q has a value of from 1 to 70, and there are at least 3 silicon-bonded hydrogen atoms present per molecule. It is not crucial but preferred that the silicon-bonded hydrogen atoms are on terminal silicon atoms for linear siloxane compounds. It is preferred that $R^4$ denotes a lower alkyl group having no more than 3 carbon atoms, most preferably a methyl group. $R^3$ preferably denotes an $R^4$ group. Preferably p=0 and q has a value of from 2 to 70, more preferably 2 to 30, or where cyclic organosilicon materials are used, from 3 to 8. It is most preferred that the organosilicon crosslinker is a siloxane polymer having a viscosity of from 1 to 150 $mm^2$/s at 25° C., more preferably 2 to 100 $mm^2$/s, most preferably 5 to 60 $mm^2$/s. The cross-linking organosilicon compound may comprise a mixture of several materials as described.

Examples of suitable organosilicon crosslinkers are trimethylsiloxane end-blocked polymethylhydrogenosiloxane having up to for example 20 carbon atoms, dimethylhydrogenosiloxane end-blocked methylhydrogeno siloxane, dimethylsiloxane methylhydrogenosiloxane copolymer and tetramethylcyclotetrasiloxane.

The size of the organosilicon crosslinker is not crucial, but preferred are short chain organosiloxane polymers having at least three silicon-bonded hydrogen atoms, which have a chain length of from 2 to 50 silicon atoms, more preferably from 5 to 20.

The curing catalyst (III) when component (a-2) is used consists of at least one metal (or compound) of the platinum group, which are also well known. The metals of the platinum group are those known under the name platinoids, this term combining, besides platinum, ruthenium, rhodium, palladium, osmium and iridium. Platinum and rhodium compounds are preferably used. Complexes of platinum and of an organic product described in U.S. Pat. No. 3,159,601, U.S. Pat. No. 3,159,602, U.S. Pat. No. 3,220,972 and European patents EP-A-0 057 459, EP-A-0 188 978 and EP-A-0 190 530, and complexes of platinum and of vinylorganosiloxanes described in U.S. Pat. No. 3,419,593, U.S. Pat. No. 3,715,334, U.S. Pat. No. 3,377,432 and U.S. Pat. No. 3,814,730 may be used in particular. The catalyst that is generally preferred is platinum. In this case, the weight amount of catalyst (III), calculated by weight of platinum metal, is generally between 2 and 400 ppm, preferably between 5 and 200 ppm on the basis of the total weight of the polyorganosiloxanes (I) and (II).

Without this being limiting, it may be considered that the adhesion promoter (VI) includes epoxy-functional, organotitanates or amino-functional organosilicon.

In a preferred embodiment the adhesion promoter (VI) compound is a mixture of:
  (VI.1) at least one alkoxy organosilane containing, per molecule, at least one $C_2$-$C_6$ alkenyl group,
  (VI.2) at last one organosilicon compound comprising at least one epoxy radical, and (VI.3) at least one metal chelate M and/or a metal alkoxide of general formula:

M(OJ)n

With:
M being chosen from the group formed by: Ti, Zr, Ge, Li, Mn, Fe, Al and Mg, and
n=valency of M and J=linear or branched $C_1$-$C_8$ alkyl.

According to the invention, an advantageous combination for the adhesion promoter is as follows:
vinyltrimethoxysilane (VTMO), representative of formula (VI.1),
3-glycidoxypropyltrimethoxysilane (GLYMO), representative of formula (VI.2), and
butyltitanate, representative of formula (VI.3).

Advantageously, the adhesion promoter (VI) is present in a proportion of from 0.1% to 10%, preferably 0.5% to 5% and even more preferably 0.5% to 3% by weight relative to all of the constituents of the curable silicone composition (A).

Examples of suitable reinforcing filler (VII), may include silica, e.g. fumed silica, precipitated silica, gel-formation silica, aerosils, titania, standard calcium carbonate or calcium carbonate that has undergone a compatibilization treatment.

The filler may have a hydrophobic surface, which may be obtained by treating the filler, e.g. with suitable silanes, short chain siloxanes, fatty acids or resinous silicone materials. Suitable materials and processes for rendering the surface of fillers hydrophobic have been described in the literature, and are known to the person skilled in the art. The amount of reinforcing filler is again not crucial, but preferably from 5 to 50% by weight of the total curable silicone composition (A) consists of the filler, more preferably from 5 to 40% and most preferably 10 to 30%.

The curable silicone composition (A) according to the invention may also comprise a standard semi-reinforcing or packing filler, for example diatomaceous earth or ground quartz.

Other non-siliceous minerals may be included as semi-reinforcing or packing mineral fillers: carbon black, titanium dioxide, aluminium oxide, hydrated alumina, expanded vermiculite, non-expanded vermiculite, zinc oxide, mica, talc, iron oxide, barium sulfate, slaked lime, etc.

These non-siliceous minerals fillers may also be present in a proportion of from 5% to 40% by weight and preferably from 5% to 30% relative to the total weight composition.

The polydiorganosiloxane gum (XI) is a polyorganosiloxane which preferably has an average unit formula $R_aSiO_{(4-a)/2}$ (with a=1, 2 or 3) which may have a linear or partially-branched structure but is preferably linear. Each R may be the same or different. With the proviso that the polyorganosiloxane has at least two alkenyl groups per molecule, R is a substituted or non-substituted monovalent hydrocarbon group which may be for example an alkyl group, such as a methyl, ethyl, propyl, butyl, and octyl groups; aryl groups such as phenyl and tolyl groups; aralkyl groups; alkenyl groups for example, vinyl, allyl, butenyl, hexenyl, and heptenyl groups; and halogenated alkyl groups for example chloropropyl and 3,3,3-trifluoropropyl groups.

The polydiorganosiloxane gum (XI) may be-terminated by any of the above groups. When R is an alkenyl group the alkenyl group is preferably vinyl group or hexenyl group. Indeed the alkenyl groups may be on terminal groups and/or polymer side chains.

Examples of the polydiorganosiloxane gum (XI) are: dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

Such polydiorganosiloxane gum (XI) are for example described in U.S. Pat. Nos. 3,142,655, 3,821,140, 3,836,489 and 3,839,266). These gums advantageously have a viscosity at 25° C. of at least equal to 0.5 million mPa·s and preferably of between 1 million to 10 million mPa·s.

In a preferred embodiment of the invention, the polydiorganosiloxane gum (XI) is added at 1 to 40 parts by weight per 100 weight parts of the curable silicone composition.

The curing inhibitor (VIII) may be chosen from the following compounds:
acetylenic alcohols.
polyorganosiloxanes substituted with at least one alkenyl that may optionally be in cyclic form, tetramethylvinyltetrasiloxane being particularly preferred,
pyridine,
organic phosphines and phosphites,
unsaturated amides, and
alkyl maleates.

These acetylenic alcohols (Cf. FR-B-1 528 464 and FR-A-2 372 874), which are among the preferred hydrosilylation-reaction thermal blockers, have the formula:

$$(R')(R'')(OH)C—C≡CH$$

in which:
R' is a linear or branched alkyl radical, or a phenyl radical; and
R'' is H or a linear or branched alkyl radical, or a phenyl radical; the radicals R' and R'' and the carbon atom α to the triple bond possibly forming a ring.

The total number of carbon atoms contained in R' and R'' being at least 5 and preferably from 9 to 20.

For the said acetylenic alcohols, examples that may be mentioned include:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol; and
diallyl maleate or diallyl maleate derivatives.

These α-acetylenic alcohols are commercial products. Such curing inhibitor (VIII) is present in a proportion of up to 1 part by weight relative to the total amount of the composition (A).

Other additional components may be included in suitable elastomer-forming compositions, including other fillers, chain extenders, dyes, colorants, pigments, viscosity modifiers, bath-life extenders, curing inhibitors (VIII), coloration additive (IX) and flexibilisers.

As additive (IX) for improving the fire resistance, examples that may be mentioned include compounds containing a phenyl group substituted with an amino (secondary or tertiary) group. Examples of such additives are found in the reference U.S. Pat. No. 5,516,938. The useful amounts of such additives are generally between 0.01 and 1 part by weight relative to the total amount of the composition.

In a manner that is known per se, the curable silicone composition (A) according to the invention may be supplemented with various conventional additives, for instance dyes.

The curable silicone composition (A) may be prepared by merely mixing the ingredients in the desired ratios. However, for reasons of storage stability and bath life before or during application of the compositions to the textile fabric, it is preferred to store the composition in two parts A and B, by separating the curing catalyst (III) from the organosilicon crosslinker (II') or polyorganosiloxanes (II) which bear hydrogeno substituents. The other components of the compositions are often distributed over both parts in proportions which will allow easy mixing of the two parts immediately prior to application. Such easy mixing ratios may be e.g. 1/10 or 1/1 ratios.

Once mixed together, the parts A and B form a ready-to-use silicone composition, which may be applied to the support by any suitable coating means (for example by doctor blade or roll).

The invention is also directed towards a method of coating a synthetic textile comprising applying the curable silicone composition (A) as described above to a synthetic textile, and allowing the coating composition to cure.

In a preferred embodiment, the synthetic textile is an airbag fabric.

The curable coating compositions (A) may be applied according to known techniques to the textile fabric substrates. These include spraying, gravure coating, bar coating, coating by knife-over-roller, coating by knife-over-air, padding and screen-printing. It is preferred that the composition is applied by a knife-over-air or knife-over-roller coating method. It is also preferred that the composition is applied to a coat-weight prior to curing of at least 20 $g/m^2$. Preferably the coating thickness is from 25 to 150 $g/m^2$, more preferably from 25 to 50 $g/m^2$ and even more preferably from 30 to 35 $g/m^2$ or applications where pressure needs to be maintained longer, e.g. in side curtain airbags, or 30 to 50 $g/m^2$ for applications where the pressure retention is not so critical over prolonged periods, e.g. in standard driver airbags. In order to make the compositions easily applicable to the textile fabric, it is preferred that the viscosity of the composition (A) is from 10,000 to 30000 mPa·s. The textile fabric is preferably scoured prior to application, in order to ensure good adhesion of the composition.

Although it is not preferred, it is possible to apply the composition in multiple layers, which together fulfill the preferred criteria set out above. It is also possible to apply onto the coating composition a further coating, e.g. of a material providing low friction, or an additional textile fabric, whether woven or non-woven to improve the strength and/or the feel of the fabric.

The compositions according to the invention are heat-cured and/or cured by electromagnetic radiation (radiation of accelerated electrons or "electron beam"). The compositions according to the invention may be used for covering or coating flexible supports, especially woven, knitted or nonwoven fibrous textiles, and preferably woven, knitted or nonwoven supports made of synthetic fibres, advantageously of polyester or polyamide.

Curing conditions for the coating are preferably at elevated temperatures over a period which will vary depending on the actual temperature used, for example 120 to 200° C. for a period of up to 5 minutes.

The advantage of the invention is that without having to combine multiple layers of coating on the surface of a textile fabric the fabric is still very able to form a barrier between areas of differing pressure. Particularly useful applications for textile fabrics coated according to the present invention are those applications where the fabric is formed into an envelope and pressure is applied inside the envelope, e.g. by introducing gas into the envelope and thus inflating it. Particularly useful applications include automotive airbags, emergency shoots on aeroplanes, hot air balloons. The most valuable use of fabrics according to the invention is in the production of side curtain airbags for automobiles, where the internal pressure of the envelope needs to be maintained for a relatively long period of time, e.g. from 1 to 5 seconds.

A final deposited thickness after curing of between 25 and 300 µm and especially between 50 and 200 µm will generally be targeted. It is not necessary to have a uniform thickness, since, if the surface of the support is not regular, it may result in an irregular deposition.

Another aspect of the invention concerns a textile fabric coated on one or two faces with a cured coating composition obtained by curing the curable silicone coating composition (A) as described above.

The invention also concerns an airbag fabric coated on one or two faces with a cured coating composition obtained by curing the curable silicone coating composition (A) as described above.

Finally, the invention concerns an inflatable bag comprising an airbag fabric coated according to the process described above.

The examples that follow, of the preparation of compositions and of their application as coating for polyamide fabric according to the process of the invention, will allow the invention to be understood more clearly and will allow its advantages and implementation variants to be highlighted. The performance qualities of the products resulting from the process according to the invention will be illustrated by means of comparative tests. All parts and percentages are by weight unless otherwise stated, and values of viscosity In these examples are measured using a Brookfield viscometer according to the indications of AFNOR standard NFT-76-106 of May 1982 relate to dynamic viscosity at 25° C.

EXAMPLES 5 compositions described in Tables 1 and 2 were prepared by mixing in a 1:1 weight ratio of part A and B. The compositions were applied to a synthetic textile and allow to cure by the application of heat. The coated synthetic textile was then tested for adhesion of the composition to the synthetic textile by a Crease Flex Test that determines the number of Crease Flex Cycles. The Crease Flex Test protocol and the Test results are shown in Table 3.

Crease Flex Test Protocol & Results

The method is employed for repeated bending and it determines the stage of dryness and adherence reached by a material covered with silicone and used for airbags.

The test protocol for measuring the Crease Flex in Cycles to Failure of the coated synthetic textiles prepared above, was carried out using a Scott No. 363 Type Folding and Abrasion Tester sold by Test Machines, Incorporated, Ronkonkoma, N.Y., and manufactured by Toyo Seiki Seisaku-Sho, Ltd., Tokyo, Japan. This test is widely used in the industry for measuring the fold abrasion and the resistance against fold fatigue, of synthetic textiles, rubber, and cloth. According to the standard test protocol, two coated fabric test strips of measuring 25 millimeter×120 millimeter are placed together, with the coated sides facing each other. The reciprocating distance of folding is set for 5 centimeter. The test strips are placed in test clamps, and the applied pressure is adjusted to 1 Kilogram. The test measures the number of cycles of folding. The number of cycles are counted to the failure point of lost adhesion of coating composition applied to the Nylon fabric.

TABLE 1

| | Components | Ex.1 Comparative Part by weight | Ex.2 Comparative Part by weight | Description |
|---|---|---|---|---|
| Part A | (I.1) | 0.00 | 16.95 | α,ω-vinyldimethylsiloxane end-blocked polydimethylsiloxane having a viscosity of about 10 000 mPa·s |
| | (I.2) | 16.00 | 16.95 | α,ω-vinyldimethylsiloxane end-blocked polydimethylsiloxane having a viscosity of about 60 000 mPa·s |
| | (II) | 12.76 | 13.20 | α,ω-trimethylsiloxane end-blocked poly(dimethyl)(hydrogenomethyl)siloxane having a viscosity of 25 mPa·s |
| | (VII) | 6.00 | 6.00 | Calcium carbonate, $CaCO_3$ (Albacar ® 5970), |
| | (IV) | 0.00 | 36.70 | Polyorganosiloxane resin of formula $MM^{Vi}Q$ |
| | (V) | 55.00 | 0.00 | Polyorganosiloxane resin of formula $MD^{Vi}Q$ |
| | (XI) | 5.24 | 5.24 | Gum: α,ω-trimethylsiloxane end-blocked poly(dimethyl)(methylvinyl)-siloxane, having a viscosity of 20 million mPa·s |
| | (VI.1) | 2.50 | 2.50 | Vinyltrimethoxysilane (VTMO), |
| | (VI.2) | 2.50 | 2.50 | Glycidoxypropyltrimethoxysilane (GLYMO) |
| | (VIII) | 0.02 | 0.02 | Ethynylcyclohexanol 1 |
| Part B | (IV) | 0.00 | 39.70 | Polyorganosiloxane resin of formula $MM^{Vi}Q$ |
| | (V) | 59.50 | 0.00 | Polyorganosiloxane resin of formula $MD^{Vi}Q$ |
| | (I.1) | 0.00 | 26.40 | α,ω-vinyldimethylsiloxane end-blocked polydimethylsiloxane having a viscosity of about 10 000 mPa·s |
| | (I.2) | 32.95 | 26.40 | α,ω-vinyldimethylsiloxane end-blocked polydimethylsiloxane having a viscosity of about 60 000 mPa·s |
| | (VII) | 6.00 | 6.00 | Calcium carbonate, $CaCO_3$ (Albacar ® 5970), |
| | (VI.3) | 1.50 | 1.50 | Butyl titanate Ti(OBu)4 (TBT); |
| | (III) | 0.05 | 0.05 | Pt complex |
| | | 1.70 | 1.70 | Ratio SiH/Si(vinyl) |

TABLE 2

| | Components | Ex. 3 Comparative Percent by weight | Ex. 4 Invention Percent by weight | Ex. 5 Invention Percent by weight | Description |
|---|---|---|---|---|---|
| Part A | (I) | 54.16 | 1.16 | 4.36 | α,ω-vinyldimethylsiloxane end-blocked polydimethylsiloxane having a viscosity of about 10 000 mPa·s |
| | (II) | 12.50 | 17.60 | 14.30 | α,ω-trimethylsiloxane end-blocked poly(dimethyl)(hydrogenomethyl)siloxane having a viscosity of 25 mPa·s |
| | (VII) | 12 | 12 | 12 | Calcium carbonate, $CaCO_3$ (Albacar ® 5970), |
| | (IV) | 10 | 58 | 58 | Polyorganosiloxane resin of formula $MM^{Vi}Q$ |
| | (XI) | 5.24 | 5.24 | 5.24 | Gum: α,ω-trimethylsiloxane end-blocked poly(dimethyl)(methylvinyl)-siloxane, having a viscosity of 20 million mPa·s |
| | (VI.1) | 3.00 | 3.00 | 3.00 | Vinyltrimethoxysilane (VTMO), |
| | (VI.2) | 3.00 | 3.00 | 3.00 | Glycidoxypropyltrimethoxysilane (GLYMO) |
| | (VIII) | 0.10 | 0.10 | 0.10 | Ethynylcyclohexanol 1 |
| Part B | (V) | 58.00 | 58.00 | 10.00 | Polyorganosiloxane resin of formula $MD^{Vi}Q$ |
| | (I) | 28.45 | 28.45 | 76.45 | α,ω-vinyldimethylsiloxane end-blocked polydimethylsiloxane having a viscosity of about 10 000 mPa·s |
| | (VII) | 12 | 12 | 12 | Calcium carbonate, $CaCO_3$ (Albacar ® 5970), |

TABLE 2-continued

| Components | Ex. 3 Comparative Percent by weight | Ex. 4 Invention Percent by weight | Ex. 5 Invention Percent by weight | Description |
|---|---|---|---|---|
| (VI.3) | 1.50 | 1.50 | 1.50 | Butyl titanate Ti(OBu)4 (TBT); |
| (III) | 0.05 | 0.05 | 0.05 | Pt complex |
|  | 1.92 | 1.92 | 1.92 | Ratio SiH/Si(vinyl) |

TABLE 3

RESULTS

| | | Ex. 1 Comparative | Ex. 2 Comparative | Ex. 3 Comparative | Ex. 4 Invention | Ex. 5 Invention |
|---|---|---|---|---|---|---|
| Crease Flex Abrasion | Warp direction (cycles) | 500 | 1500 | 500 | 1000 | 1000 |
|  | Fill direction (cycles) | 500 | 2000 | 500 | 1000 | 2000 |
| Air Holding | Pressure loss in % after 5 s | −18 | −30 | −29 | −22 | −23 |

Example 1=comparative, only one resin of type (V) $MD^{Vi}Q$ is used.

Example 2=comparative, only one resin (IV) MMviQ is used.

Example 3=comparative although both resins are used, resin (IV) of formula MMviQ is used in an amount of only 5 parts by weight per 100 parts of the curable composition=mixture of 1:1 by weight of parts A:and B.

Examples 4 and 5=Invention, blend of two resins (IV) (over 10 and (V), show that a silicone composition, involving a blend of 2 resins according to the invention, when coated and cured onto a fabric, brings a very good compromise between the crease flex abrasion and air holding performances.

Other variations may be made in compounds, compositions, and methods described without departing from the essential features of the invention. The embodiments of the invention specifically illustrated herein are exemplary only and not intended as limitations on their scope except as defined in the appended claims.

The invention claimed is:

1. A curable silicone composition (A) useful for coating textile fabrics and comprising:
   (1) components (a-1) or (a-2):
      (a-1) corresponding to at least one polyorganosiloxane that may be cured by the action of a catalyst based on at least one organic peroxide, and
      (a-2) corresponding to a polyorganosiloxane blend that may be cured by polyaddition reactions, comprising:
         at least one organopolysiloxane (I) having an average of at least two silicon-bonded aliphatically unsaturated hydrocarbon substituents on the molecule, and
         at least one organopolyorganosiloxane (II) and/or at least one organosilicon crosslinker (II') having an average of at least 2 silicon-bonded hydrogen on the molecule,
   (2) an effective amount of a curing catalyst (III) comprising: when component (a-1) is used, at least one organic peroxide, and when component (a-2) is used, at least one catalyst able to promote the reaction of the aliphatically unsaturated hydrocarbon substituents with SiH groups,
   (3) at least 10 weight parts, per 100 weight parts of the curable silicone composition, of an organopolysiloxane resin (IV) of formula $MM^{Vi}Q$ and consisting essentially of:
      (a) monovalent siloxane units $M^{Vi}$ of the formula $R'R_2SiO_{1/2}$;
      (b) monovalent siloxane units M of the formula $R_3SiO_{1/2}$, and
      (c) tetravalent siloxane units Q of the formula $SiO_{4/2}$
      wherein R denotes a monovalent hydrocarbon group and R' denotes a vinyl group:
   (4) an organopolysiloxane resin (V) different from the said organopolysiloxane resin (IV) and comprising at least two different siloxane units chosen from those of M siloxane unit of formula $R_3SiO_{1/2}$, D siloxane unit of formula $R_2SiO_{2/2}$, T siloxane unit of formula $RSiO_{3/2}$ and Q siloxane unit of formula $SiO_{4/2}$,
      wherein R denotes a monovalent hydrocarbon group, on condition that at least one siloxane unit being a T or Q siloxane unit and that at least one of the M, D and T siloxane units comprises an alkenyl group
   (5) at least one adhesion promoter (VI),
   (6) at least one reinforcing filler (VII),
   (7) at least one polydiorganosiloxane gum (XI) which is a linear or partially-branched homopolymer or copolymer having at least 2 alkenyl groups per molecule and the said gum having a viscosity of greater than 500,000 mPa·s at 25° C.,
   (8) optionally, at least one curing inhibitor (VIII),
   (9) optionally, at least one coloration additive (IX), and
   (10) optionally, at least one additive (X) for improving the fire resistance, and
wherein the polydiorganosiloxane gum (XI) is added at 1 to 40 parts by weight per 100 weight parts of the curable silicone composition.

2. A curable silicone composition (A) according to claim 1, wherein
   the organopolysiloxane resin (V) is selected from the group consisting of:

an organopolysiloxane resin of formula MT$^{Vi}$Q consisting essentially of:
(a) trivalent siloxane units T$^{Vi}$ of the formula R'SiO$_{3/2}$;
(b) monovalent siloxane units M of the formula R$_3$SiO$_{1/2}$, and
(c) tetravalent siloxane units Q of the formula SiO$_{4/2}$
an organopolysiloxane resin of formula MD$^{Vi}$Q consisting essentially of:
(a) divalent siloxane units D$^{Vi}$ of the formula RR'SiO$_{2/2}$;
(b) monovalent siloxane units M of the formula R$_3$SiO$_{1/2}$, and
(c) tetravalent siloxane units Q of the formula SiO$_{4/2}$
an organopolysiloxane resin of formula MDD$^{Vi}$Q consisting essentially of:
(a) divalent siloxane units D$^{Vi}$ of the formula RR'SiO$_{2/2}$;
(b) divalent siloxane units D of the formula R$_2$SiO$_{2/2}$
(b) monovalent siloxane units M of the formula R$_3$SiO$_{1/2}$, and
(c) tetravalent siloxane units Q of the formula SiO$_{4/2}$
an organopolysiloxane resin of formula M$^{Vi}$Q consisting essentially of:
(a) monovalent siloxane units M$^{Vi}$ of the formula R'R$_2$SiO$_{1/2}$; and
(b) tetravalent siloxane units Q of the formula SiO$_{4/2}$
an organopolysiloxane resin of formula M$^{Vi}$T$^{Vi}$Q consisting essentially of:
(a) monovalent siloxane units M$^{Vi}$ of the formula R'R$_2$SiO$_{1/2}$;
(b) trivalent siloxane units T$^{Vi}$ of the formula R'SiO$_{3/2}$, and
(c) tetravalent siloxane units Q of the formula SiO$_{4/2}$
wherein R denotes a monovalent hydrocarbon group and R' denotes a vinyl group.

3. A curable silicone composition (A) according to claim 2, wherein the organopolysiloxane resin (V) is an organopolysiloxane resin of formula MT$^{Vi}$Q consisting essentially of:
(a) trivalent siloxane units T$^{Vi}$ of the formula R'SiO$_{3/2}$;
(b) monovalent siloxane units M of the formula R$_3$SiO$_{1/2}$, and
(c) tetravalent siloxane units Q of the formula SiO$_4$.

4. A curable silicone composition (A) according to claim 2, wherein the organopolysiloxane resin (V) is an organopolysiloxane resin of formula M$^{Vi}$Q consisting essentially of:
(a) monovalent siloxane units M$^{Vi}$ of the formula R'R$_2$SiO$_{1/2}$; and
(b) tetravalent siloxane units Q of the formula SiO$_{4/2}$.

5. A curable silicone composition (A) according to claim 2, wherein the organopolysiloxane resin (V) is an organopolysiloxane resin of formula M$^{Vi}$T$^{Vi}$Q consisting essentially of:
(a) monovalent siloxane units M$^{Vi}$ of the formula R'R$_2$SiO$_{1/2}$;
(b) trivalent siloxane units T$^{Vi}$ of the formula R'SiO$_{3/2}$, and
(c) tetravalent siloxane units Q of the formula SiO$_{4/2}$.

6. A curable silicone composition (A) according to claim 1 wherein the organopolysiloxane resin (IV) is added at 15 to 50 weight parts per 100 weight parts of the curable silicone composition.

7. A curable silicone composition (A) according to claim 1 wherein the organopolysiloxane resin (V) is added at 1 to 50 weight parts per 100 weight parts of the curable silicone composition.

8. A method of coating a synthetic textile comprising applying the curable silicone composition (A) according to claim 1 to a synthetic textile, and allowing the coating composition to cure.

9. A method according to claim 8 in which the synthetic textile is an airbag fabric.

10. A textile fabric coated on one or two faces with a cured coating composition obtained by curing the curable silicone coating composition (A) according to claim 1.

11. An airbag fabric coated on one or two faces with a cured coating composition obtained by curing the curable silicone coating composition (A) according to claim 1.

12. Inflatable bag comprising an airbag fabric coated according to claim 10.

13. A curable silicone composition (A) according to claim 1, comprising component (a-2).

14. A curable silicone composition (A) according to claim 1, comprising at least one curing inhibitor (VIII).

15. A curable silicone composition (A) useful for coating textile fabrics and comprising:
(1) components (a-1) or (a-2):
(a-1) corresponding to at least one polyorganosiloxane that may be cured by the action of a catalyst based on at least one organic peroxide, and
(a-2) corresponding to a polyorganosiloxane blend that may be cured by polyaddition reactions, comprising:
at least one organopolysiloxane (I) having an average of at least two silicon-bonded aliphatically unsaturated hydrocarbon substituents on the molecule, and
at least one organopolyorganosiloxane (II) and/or at least one organosilicon crosslinker (II') having an average of at least 2 silicon-bonded hydrogen on the molecule,
(2) an effective amount of a curing catalyst (III) comprising: when component (a-1) is used, at least one organic peroxide, and when component (a-2) is used, at least one catalyst able to promote the reaction of the aliphatically unsaturated hydrocarbon substituents with SiH groups,
(3) at least 10 weight parts, per 100 weight parts of the curable silicone composition, of an organopolysiloxane resin (IV) of formula MM$^{Vi}$Q and consisting essentially of:
(a) monovalent siloxane units M$^{Vi}$ of the formula R'R$_2$SiO$_{1/2}$;
(b) monovalent siloxane units M of the formula R$_3$SiO$_{1/2}$, and
(c) tetravalent siloxane units Q of the formula SiO$_{4/2}$
wherein R denotes a monovalent hydrocarbon group and R' denotes a vinyl group:
(4) an organopolysiloxane resin (V) different from the said organopolysiloxane resin (IV) and comprising at least two different siloxane units chosen from those of M siloxane unit of formula R$_3$SiO$_{1/2}$, D siloxane unit of formula R$_2$SiO$_{2/2}$, T siloxane unit of formula RSiO$_{3/2}$ and Q siloxane unit of formula SiO$_{4/2}$,
wherein R denotes a monovalent hydrocarbon group, on condition that at least one siloxane unit being a T or Q siloxane unit and that at least one of the M, D and T siloxane units comprises an alkenyl group
(5) at least one adhesion promoter (VI),
(6) at least one reinforcing filler (VII),
(7) optionally at least one polydiorganosiloxane gum (XI) which is a linear or partially-branched homopolymer or copolymer having at least 2 alkenyl groups per molecule and the said gum having a viscosity of greater than 500,000 mPa·s at 25° C.,
(8) optionally, at least one curing inhibitor (VIII),
(9) optionally, at least one coloration additive (IX), and
(10) optionally, at least one additive (X) for improving the fire resistance, and wherein the organopolysiloxane resin (V) is an organopolysiloxane resin of formula $MD^{Vi}Q$ consisting essentially of:
  (a) divalent siloxane units $D^{Vi}$ of the formula $RR'SiO_{2/2}$;
  (b) monovalent siloxane units M of the formula $R_3SiO_{1/2}$, and
  (c) tetravalent siloxane units Q of the formula $SiO_{4/2}$
  wherein R denotes a monovalent hydrocarbon group and R' denotes a vinyl group.

16. A curable silicone composition (A) useful for coating textile fabrics and comprising:
  (1) component (a-1):
    (a-1) corresponding to at least one polyorganosiloxane that may be cured by the action of a catalyst based on at least one organic peroxide, and
  (2) an effective amount of at least one organic peroxide curing catalyst (III),
  (3) at least 10 weight parts, per 100 weight parts of the curable silicone composition, of an organopolysiloxane resin (IV) of formula $MM^{Vi}Q$ and consisting essentially of:
    (a) monovalent siloxane units $M^{Vi}$ of the formula $R'R_2SiO_{1/2}$;
    (b) monovalent siloxane units M of the formula $R_3SiO_{1/2}$, and
    (c) tetravalent siloxane units Q of the formula $SiO_{4/2}$
    wherein R denotes a monovalent hydrocarbon group and R' denotes a vinyl group:
  (4) an organopolysiloxane resin (V) different from the said organopolysiloxane resin (IV) and comprising at least two different siloxane units chosen from those of M siloxane unit of formula $R_3SiO_{1/2}$, D siloxane unit of formula $R_2SiO_{2/2}$, T siloxane unit of formula $RSiO_{3/2}$ and Q siloxane unit of formula $SiO_{4/2}$,
    wherein R denotes a monovalent hydrocarbon group, on condition that at least one siloxane unit being a T or Q siloxane unit and that at least one of the M, D and T siloxane units comprises an alkenyl group
  (5) at least one adhesion promoter (VI),
  (6) at least one reinforcing filler (VII),
  (7) optionally at least one polydiorganosiloxane gum (XI) which is a linear or partially-branched homopolymer or copolymer having at least 2 alkenyl groups per molecule and the said gum having a viscosity of greater than 500,000 mPa·s at 25° C.,
  (8) optionally, at least one curing inhibitor (VIII),
  (9) optionally, at least one coloration additive (IX), and
  (10) optionally, at least one additive (X) for improving the fire resistance.

17. A curable silicone composition (A), useful for coating textile fabrics and comprising:
  (1) components (a-1) or (a-2):
    (a-1) corresponding to at least one polyorganosiloxane that may be cured by the action of a catalyst based on at least one organic peroxide, and
    (a-2) corresponding to a polyorganosiloxane blend that may be cured by polyaddition reactions, comprising:
      at least one organopolysiloxane (I) having an average of at least two silicon-bonded aliphatically unsaturated hydrocarbon substituents on the molecule, and
      at least one organopolyorganosiloxane (II) and/or at least one organosilicon crosslinker (II') having an average of at least 2 silicon-bonded hydrogen on the molecule,
  (2) an effective amount of a curing catalyst (III) comprising: when component (a-1) is used, at least one organic peroxide, and when component (a-2) is used, at least one catalyst able to promote the reaction of the aliphatically unsaturated hydrocarbon substituents with SiH groups,
  (3) at least 10 weight parts, per 100 weight parts of the curable silicone composition, of an organopolysiloxane resin (IV) of formula $MM^{Vi}Q$ and consisting essentially of:
    (a) monovalent siloxane units $M^{Vi}$ of the formula $R'R_2SiO_{1/2}$;
    (b) monovalent siloxane units M of the formula $R_3SiO_{1/2}$, and
    (c) tetravalent siloxane units Q of the formula $SiO_{4/2}$
    wherein R denotes a monovalent hydrocarbon group and R' denotes a vinyl group:
  (4) an organopolysiloxane resin (V) different from the said organopolysiloxane resin (IV) and comprising at least two different siloxane units chosen from those of M siloxane unit of formula $R_3SiO_{1/2}$, D siloxane unit of formula $R_2SiO_{2/2}$, T siloxane unit of formula $RSiO_{3/2}$ and Q siloxane unit of formula $SiO_{4/2}$,
    wherein R denotes a monovalent hydrocarbon group, on condition that at least one siloxane unit being a T or Q siloxane unit and that at least one of the M, D and T siloxane units comprises an alkenyl group
  (5) at least one adhesion promoter (VI),
  (6) at least one reinforcing filler (VII),
  (7) optionally at least one polydiorganosiloxane gum (XI) which is a linear or partially-branched homopolymer or copolymer having at least 2 alkenyl groups per molecule and the said gum having a viscosity of greater than 500,000 mPa·s at 25° C.,
  (8) optionally, at least one curing inhibitor (VIII),
  (9) optionally, at least one coloration additive (IX), and
  (10) optionally, at least one additive (X) for improving the fire resistance, and wherein the organopolysiloxane resin (V) is an organopolysiloxane resin of formula $MDD^{Vi}Q$ consisting essentially of:
    (a) divalent siloxane units $D^{Vi}$ of the formula $RR'SiO_{2/2}$;
    (b) divalent siloxane units D of the formula $R_2SiO_{2/2}$
    (b) monovalent siloxane units M of the formula $R_3SiO_{1/2}$, and
    (c) tetravalent siloxane units Q of the formula $SiO_{4/2}$.

* * * * *